United States Patent [19]

Goldberg et al.

[11] Patent Number: 4,610,220
[45] Date of Patent: Sep. 9, 1986

[54] INFLATION FOR A TEAT CUP

[76] Inventors: Edward Goldberg, 225 Maple Hill Rd., Glencoe, Ill. 60022; Seymour Bazell, 9235 N. Latrobe, Skokie, Ill. 60077

[21] Appl. No.: 730,389

[22] Filed: May 6, 1985

[51] Int. Cl.⁴ .............................................. A01J 5/04
[52] U.S. Cl. .............................. 119/14.47; 119/14.49; 119/14.5
[58] Field of Search ............... 119/14.47, 14.48, 14.49, 119/14.50, 14.51, 14.52, 14.53, 14.5

[56] References Cited

U.S. PATENT DOCUMENTS

| | | | |
|---|---|---|---|
| 2,340,296 | 1/1944 | Bender | 119/14.52 |
| 2,622,559 | 12/1952 | Luth | 119/14.47 |
| 3,096,740 | 7/1963 | Noorlander | 119/14.52 |
| 3,158,136 | 11/1964 | George | 119/14.52 |
| 3,289,634 | 12/1966 | Simons | 119/14.52 |
| 3,659,558 | 5/1972 | Noorlander | 119/14.52 |
| 4,141,319 | 2/1979 | Maier et al. | 119/14.47 |

*Primary Examiner*—Hugh R. Chamblee
*Attorney, Agent, or Firm*—Hosier & Sufrin, Ltd.

[57] ABSTRACT

An inflation for a teat cup is made in the form of a silicone tube adapted to fit into, and seal the ends of, a teat cup. Pulsating pressure is applied to the outside of the inflation within the teat cup, and a low pressure line is attached to the downstream end of the inflation. An integral annular bead is spaced slightly less than a teat's length below the upstream end of the inflation. Axial ribs are spaced around the circumference of the tube upstream of the annular bead. The bead and ribs are resistive of collapse and therefore provide a gentle massaging action on the teat when the pulsating pressure is applied. In one important embodiment, the head of the inflation is provided with a pliant skirt and an annular cushion that fit against the teat and udder to minimize irritation and maximize retention of the inflation.

14 Claims, 6 Drawing Figures

INFLATION FOR A TEAT CUP

This invention relates to teat cups for milking machines, and more particularly to improved resilient tubular liners, or inflations, for such teat cups.

BACKGROUND OF THE INVENTION

A teat cup for a milking machine is an annular rigid shell with a port for attachment to a pulsating pressure line, as described generally in D. O. Noorlander, U.S. Pat. No. 3,096,740 and also as shown in T. W. Erbach, U.S. Pat. No. 4,269,143.

An elongated, resilient, tubular liner, called an inflation, fits inside the cup. The inflation is longitudinally stretched and secured between the ends of the cup to provide a substantially airtight chamber between the outside of the inflation and the inside of the cup. The port communicates with the chamber. A tubular part of the inflation may project outwardly of the downstream end of the cup for attachment to a milking line which is subjected to a substantially constant sub-atmospheric pressure. The tubular part thereby communicates the sub-atmospheric pressure to the interior of the inflation, the upstream opening of the inflation being sealed off by insertion of a teat. A pulsating vacuum line connected to the port communicating with the chamber carries a pressure which alternates between a higher pressure, typically atmospheric, and a lower pressure which will generally not be greater than the constant sub-atmospheric pressure applied to the vacuum milking line. When the higher pressure is applied to the airtight chamber there is an over-pressure on the exterior of the inflation. The inflation collapses, at least partially, in response to the overpressure.

The upstream end of the inflation may be a retaining skirt which is constructed to stretch fit over the upstream end of the cup to provide an airtight seal, as disclosed in U.S. Pat. No. 3,096,740, Near the downstream end of the inflation are one or more external integral annular ribs which are larger in diameter than the internal diameter of the downstream end of the teat cup. Accordingly the inflation is stretched axially between the upstream and downstream ends of the teat cup, and the annular rib is tensioned against the teat cup lower end to provide an airtight seal. Extending inward from the skirt is a resilient annular flange portion for receiving the teat and holding it during the milking operation.

Such annular flange is disclosed in U.S. Pat. No. 3,096,740 and also in J. Maier, U.S. Pat. No. 4,141,319. As disclosed in those patents, the inner periphery of the annular flange bends downward to receive the teat and hold it in the teat cup, with the intention of providing a milking movement in response to the periodic pressure changes produced by the pulsating vacuum. The annular flange is, for this purpose, made to be very flexible, as disclosed in D. F. Siddal, U.S. Pat. No. 3,474,760, in connection with an inflation of unitary construction.

In U.S. Pat. No. 3,096,740 an integrally formed external annular rib is provided around the exterior of the inflation, axially located in the middle section. A resilient sleeve surrounds the part of the inflation above the rib. The sleeve is intended to provide tension when a teat is inserted into the inflation, in order to grip the teat.

Known inflations have a number of drawbacks, including inadequate retention on the teat, uncomfortable and dangerous irritation and injury to the teat and udder, and short useful lifetimes due to wear and breakage.

Heretofore, tightly fitting inflations with correspondingly good retention characteristics caused the greatest teat irritation and injury, as a result of the tightness of the fit. A need therefore exists for an inflation which will hold securely to the teat during milking without causing irritation or injury either during milking or upon removal of the inflation. Inflations previously constructed from rubber have had lifetimes of the order of a thousand or so milkings. The rubber sleeve in U.S. Pat. No. 3,096,740, for example, had to be shielded by the inflation from the milk in the inflation in order to preserve the sleeve's elasticity. More recently, with the advent of silicone inflations, the lifetime has increased by a factor of about five. Nevertheless, it would be highly desirable to yet further increase the durability and hence the average lifetimes of silicone inflations by optimizing their design.

DETAILED DESCRIPTION OF A PREFERRED EMBODIMENT

Figure 1:
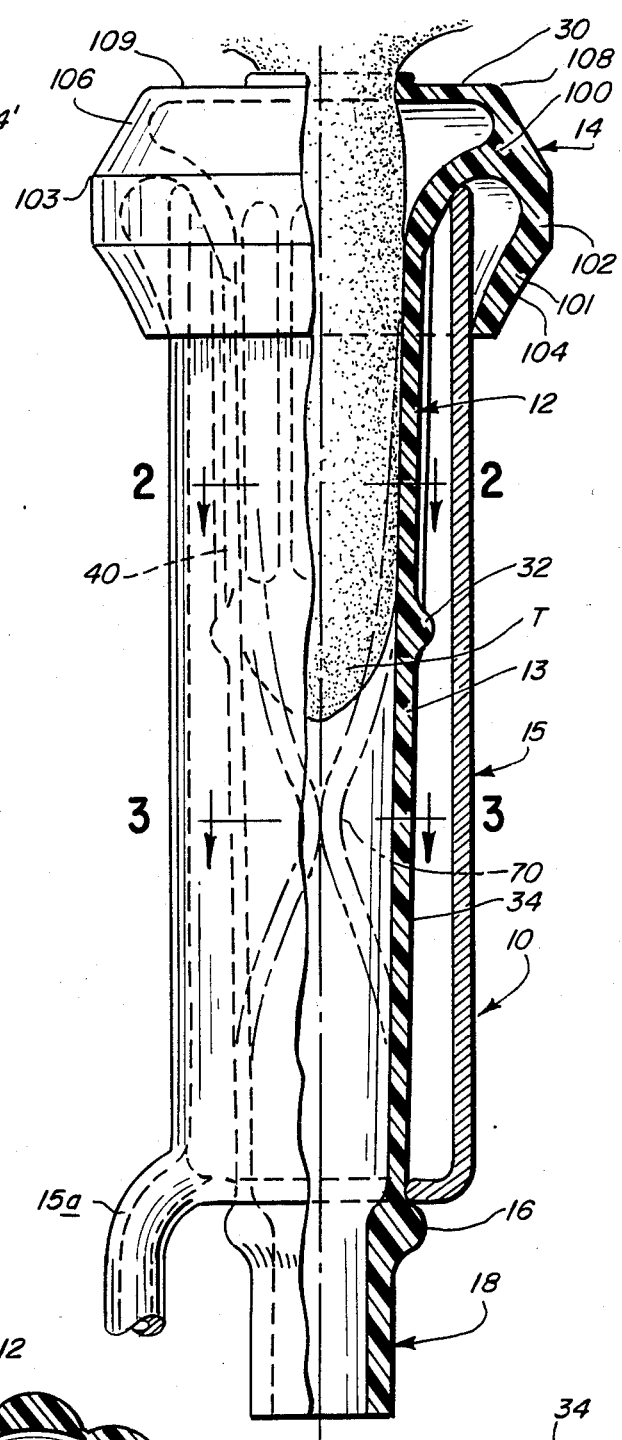
FIG. 1 illustrates a cut-away, side elevational view, partly in section, of a teat cup and a new and improved inflation therefor, embodying principles of the present invention.

As illustrated in FIG. 1, a teat cup inflation assembly 10, constructed in accordance with principles of the present invention, may have the form of a conical, frustum shaped, resilient inflation tube 12 made of silicone rubber, with an external wall 13. A head structure 14 at the wider, or upstream end of the conical frustum, comprises an annular body constructed to fit over the upstream end of a rigid, preferably metal, teat cup 15, to provide a sealed fit. An annular rib, or bead, 16 near the lower end of, and protruding outwardly from, the wall 13 is to be pulled through the lower, or downstream end of the teat cup, so that when assembled, as seen in FIG. 1, the bead 16 is tensioned against the teat cup's lower edge to provide another sealed fit. Accordingly, the space between the inflation wall 13 and the teat cup 15 provides a chamber to which a pulsating pressure may be applied through a tubular extension 15a of rigid teat cup 15.

The lower end 18 of the inflation 12, below the annular bead 16, is made relatively less resilient by providing the end with relatively thick walls, as shown in FIG. 1. Accordingly the less resilient lower end 18 is adapted for connection to a low pressure milking line, which may be, as known in the art, a hose connected to a vacuum pump.

An annular transverse flange 30, integral with the head structure 14 of the inflation 12, projects inwardly from the head structure at the upstream end of inflation 12. As shown in FIG. 1, the design of head structure 14 permits the outer circumference of flange 30 to exceed the circumference of cup 15. The resulting breadth of flange 30 lends enhanced flexibility to the flange. The annular flange 30 surrounds an opening having a size suitable for insertion of a cow's teat, with the lower end of the teat T projecting into the interior of the inflation's tube 12. The size of the opening within the flange 30 is such that when the teat is inserted and low pressure is applied to the end 18 of the inflation, the upstream end of the tube is sealed by the presence of the teat therein, and suction is accordingly applied to the lower end of teat T. The enhanced flexibility of flange 30, on the other hand, minimizes teat irritation.

The tube 12 thickens into an integral, exteriorly located, annular bead 32 spaced slightly less than a teat's length below the flange 30. The spacing cannot be made precise because teats are generally of different lengths, varying from individual to individual, and from herd to herd. Accordingly, inflations are made with a variety of spacings between the annular bead 32 and the flange 30 so that suitable inflations may be selected for each cow. The annular bead 32 inhibits collapse of the upper portion of tube 12 when an external overpressure condition occurs, that is, when the pressure on the outside of the inflation wall 13 exceeds the pressure on the inside of the wall. This ensures that the stronger massaging action is applied to the teat at the upper end of the inflation, nearer the udder.

Figure 2:
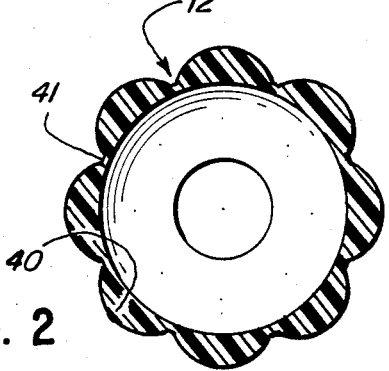
FIG. 2 is a cross-sectional view of an upper portion of the inflation of FIG. 1, and is taken substantially at the section line 2—2 shown in FIG. 1.

A plurality of axially elongated, circumferentially spaced, ribs, such as is illustrated by rib 40, seen in transverse section in FIG. 2, comprise thickened portions of the tube 12. The ribs 40 are equally spaced circumferentially from each other around the circumference of the tube 12 and extend axially between the annular bead 32 and the head structure 14. The ribs provide circumferentially spaced, axial stiffeners, separated by relatively thin walled regions 41, defined in the upper part of the tube 12. Accordingly, when external overpressure is applied to the tube 12 the upper part of the tube collapses by buckling of some of the thin walled regions 41 inwardly, and at least some of the ribs 40 then press radially inwardly against the teat to provide a massaging action. The massaging action is gentle because the ribbed construction provides means adapted to inhibit total collapse of the upper portion of the teat cup against the teat.

Figure 3:
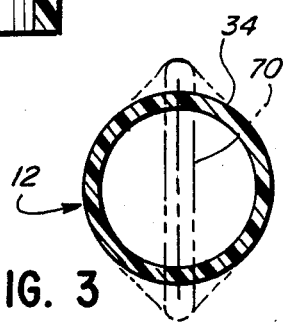
FIG. 3 is a cross-sectional view of a collapsed lower portion of the inflation of FIG. 1, taken substantially at the section line 3—3 of FIG. 1.

By contrast, the lower part 34 of the tube 12 is not provided with stiffening ribs such as rib 40. Under action of external overpressure applied to the tube 12, the lower part 34 of inflation 12 will buckle along part of its length below the lower end of teat T. The buckling will cause the wall 13 of inflation 12 to pinch inwardly along a diametric line below the lower end of the teat as illustrated by the dotted line 70 in FIGS. 1 and 3. The pinching seals off the lower terminus of teat T, as shown in phantom in FIG. 1, from the suction caused by the low pressure applied to the lower end 18 of the teat cup, thereby providing a rest period for the teat from the suction applied to the teat.

Figure 4:
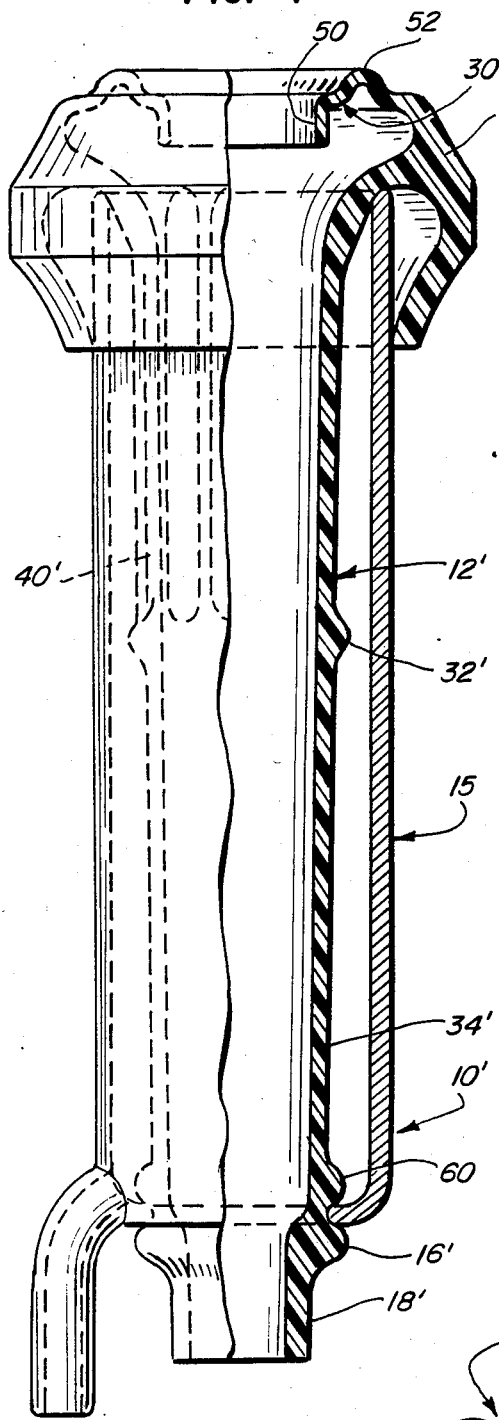
FIG. 4 illustrates a modified form of an inflation for use with the teat cup shown in FIG. 1.

A second embodiment of an inflation embodying principles of the present invention is illustrated in FIG. 4. This embodiment includes means for enhancing the retention of the inflation on the teat, for enhancing the sealing of the top of the inflation to the udder and for minimizing irritation to both the teat and the udder.

Retention and sealing are enhanced and irritation minimized by increasing contact area and decreasing transmitted wall pressure. It is noted in this connection that $PF = TWP \times CA$, wherein PF is "pull force" or the force which will pull the inflation from the teat, TWP is "transmitted wall pressure", and CA is "contact area". As apparent from the figures and as explained below, contact area is increased in this embodiment, permitting transmitted wall pressure (a primary source of irritation) to be reduced while maintaining or increasing the pull force.

In the alternate construction shown in FIG. 4 the transverse flange 30' is shaped, as illustrated, to extend inwardly from head structure 14 and to then turn downwardly to provide an innermost portion, or skirt, 50, which has significantly greater contact area (CA) than the inner periphery of the opening in flange 30 of the embodiment of FIG. 1. Accordingly, the transmitted wall pressure along the area of contact to the teat can be reduced by yet further widening the flange and increasing its resiliency.

In fact, as shown in FIG. 7, an annular bulge, or inverted U-shaped section, of relatively thin walled silicone rubber is provided between the skirt 50 and the head structure 14' in lieu of flange 30 of FIG. 1. This reduces the transmitted wall pressure (TWP) at the point of entry to skirt 50. It also provides a cushion 52 having an upwardly convex arcuate radial cross-section projecting upstreamwardly from the transverse portion of the flange 30'. The skirt 50 and cushion 52 are made much thinner than the remainder of the head structure 14' in order to be very pliant. When a teat is inserted into the tube 12', the skirt 50 presses against and seals with the upper part of the teat adjacent the cow's udder. The annular cushion 52 is dimensioned to cushion against the udder where it joins the teat, with cushion 52 serving to further minimize irritation. The pliability of the skirt 50 and cushion 52 aid in minimizing irritation to the teat and udder.

The embodiment shown in FIG. 4 also illustrates an alternate construction of the downstream end of the inflation with two annular beads 16' and 60 spaced axially of the length of the inflation 12'. The spaced beads are adapted to fit respectively upstream and downstream of the lower end of the teat cup 15, as seen in FIG. 4, to more positively retain the inflation in the cup.

In both of the embodiments illustrated in FIGS. 1 and 4 the head structures 14 and 14' are shaped to minimize breakage resulting from being stepped upon by a cow. Accordingly, the head structure 14 is integrally connected by an annular throat section 100 formed by an outwardly flared upstream end of the wall 12. The upper edge of rigid cup 15 abuts against the underside of the annular throat section 100. The lower part of head structure 14 comprises generally a cylindrically symmetric outer retaining skirt 101 that is integral with and extends generally downwardly and inwardly from the outer edge of throat section 100. The skirt 101 extends from the throat section 100. The lower extremity of the skirt 101 is spaced from the exterior wall 13 of the tube 12 and shaped to fit over and seal against the wall of cup 15 below the upper end of the wall.

The exterior of the skirt 101 has a cylindrical section 102 that extends downwardly from a shoulder 103 that is spaced outwardly from the throat 100. An inwardly tapered conical frustum 104 extends downwardly and inwardly from the cylindrical section 102 to the lower extremity of skirt 10.

A conical frustum attachment section 106 is formed integrally with the ring 100 and the upper edge of the cylindrical section 102. The outer face 107 of the attachment section 106 extends upwardly of and inclines inwardly from the shoulder 103 to provide an uppermost circular edge 108 coaxial with the tube 12, but with a larger diameter than the tube 12. The horizontal, annular flange 30 is formed integrally with and extends inwardly from the attachment section 106. The upper face 109 of flange 30 extends inwardly from the circular edge 108.

The sections 102, 104 and 106 are made relatively thick, as compared with inflation section 12 to provide strength.

Figure 5:
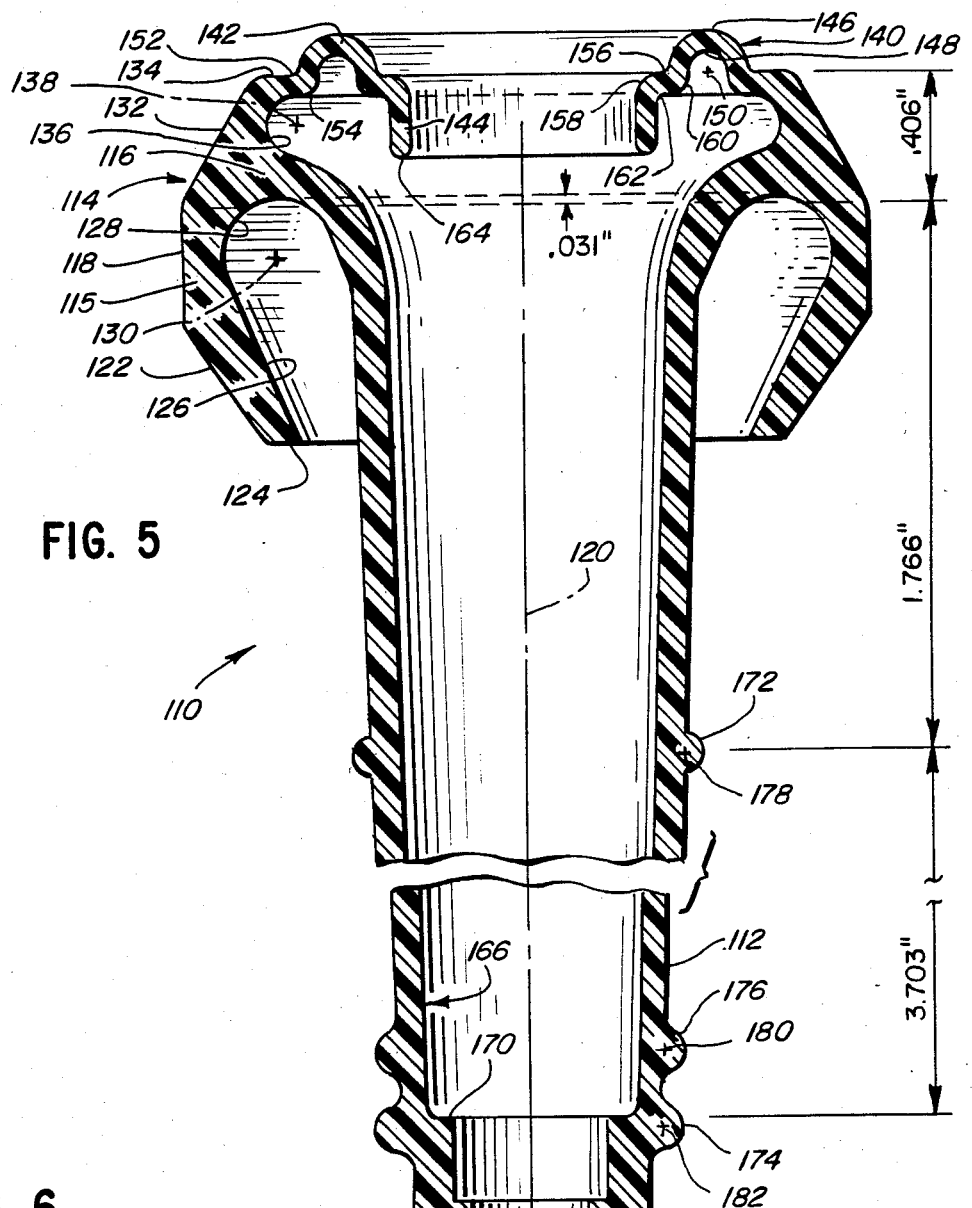
FIG. 5 illustrates a broken, sectional side elevational view of another modification of an inflation for use with the teat cup shown in FIG. 1, in which typical useful dimensions are indicated.
Figure 6:
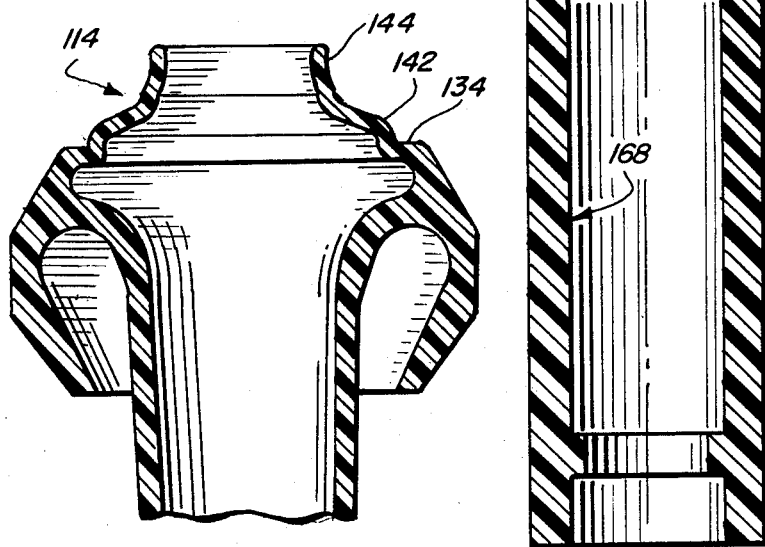
FIG. 6 illustrates the inflation shown in FIG. 5 with a teat receiving annular flange fixed upwardly to permit easy teat withdrawal.

The inflation 110 illustrated in FIGS. 5–6 embodies features derived from the present invention that are particularly protective of a cow's teat and udder. A tube 112 is topped by a head structure 114 of the inflation 110. The head structure 114 comprises generally a cylindrically symmetric outer skirt 115 that is integral with, and extends generally downwardly from, an outwardly flaring annular throat section 116 defining the upper portion of the tube 112. The head structure is the same as that depicted in FIG. 4 except that typical useful dimensions are indicated. Although described below in terms including dimensions of a desirable embodiment of the head structure, these dimensions are not intended to be limiting of the invention.

Accordingly, the exterior of the skirt 115 has a right cylindrical section 118 having a diameter of 2.25" and a height of 0.360" centered on the vertical axis 120 of the inflation, An inwardly tapered conical lower frustum 122 descends at an angle of 35° from the vertical to a distance of 0.406" below the bottom of cylindrical section 118. The bottom of lower frustum 122 corners inwardly to a horizontal section 124 having a width of 0.078." Horizontal section 124 corners at its innermost edge to an inner frustum 126 rising outwardly at a 26° angle from the vertical axis. Inner frustum 126 connects smoothly to the bottom of a circular arc 128 that joins smoothly to the lower surface of the throat section 116. The circular arc 128 is of radius 0.118" and is centered on a horizontal circular line of centers 130. The line of centers 130 has a diameter of 1.624" and is spaced 0.157" below the top of the cylindrical section 118.

The inner surfaces 126, 128 are adapted to be positioned in sealing fashion over the upper edge of the teat cup 15.

An inwardly tapered upper conical frustum 132 rises above the upper edge of the cylinder 118 at an angle of 30° from the vertical. The top of upper conical frustum 132 rounds over, with a radius of 0.125", to a flat annular horizontal surface 134 which is spaced 0.406" above the top of circular 118.

Upper conical frustum 132 and surface 134 are the outer boundaries of a section that has as its inner boundary a circular arc surface 136 of radius 0.094" centered on a horizontal circular line of centers 138. Circular line of centers 138 has a diameter of 1.500" and is spaced 0.157" below the flat annular surface 134. The circular arc surface extends outwardly, starting from vertically above line of centers 138 and extending to below the line of centers 138, where the surface flares smoothly into the outwardly flared inner surface of the tube 112. The horizontal flat annular surface 134 and the upper extremity of circular arc surface 136 thereby define the outward portion of a generally inwardly directed annular lip 140 having a thickness of about 0.063".

Annular lip 140 is shaped to include an annular, upwardly extending cushion portion 142 which continues inwardly from the flat surface 134 to a downwardly directed teat receiving annular flange 144, each having a thickness of about 0.063". The cushion portion 142 is bounded by semicircles 146, 148 centered on, and above, a horizontal circular line of centers 150. Circular line of centers 150 has a 1.219" diameter and lies in the plane defined by the flat horizontal surface 134. The semicircles 146, 148 have respective radii 0.125" and 0.063". The semicircles 146, 148 are faired smoothly outwardly into the respective surfaces 134, 136 by arcs 152, 154 having respective radii 0.031" and 0.063".

The inner end of semicircle 146 joins smoothly to a 90° concave arc 156 of radius 0.031" and then to a 90° convex arc 158 of radius 0.125" to flares into the outer surface of flange 144. Correspondingly, the outer end of semicircle 148 joins smoothly to an approximately 90° convex arc 160 of radius 0.063" and then to a 90° concave arc 162 of radius 0.063" to fair into the inner surface of the teat receiving flange 144. Flange 144 extends to a distance of 0.157" below horizontal surface 134 where it terminates in a convex semicircular tip 164 having a diameter of 0.063".

It may be seen from the description that annular lip 140 comprises an inner, cantilevered portion of the head structure 114, which is very flexible inwardly of the cushion portion 142. Accordingly, when the inflation 110 is removed from a teat, the teat will pull the end 164 of downwardly directed teat receiving flange 144 in an upward direction. As a result, the annular flange 144 will flex upward to form an upward directed annular rim, as illustrated in FIG. 6. The annular rim will permit easy withdrawal of the inflation from the teat because the end 164 is no longer positioned to resist withdrawal of the teat.

The tube below the head structure 114 may comprise a tapered portion 166 and a thickened straight portion 168. The tapered portion tapers inwardly in the downgoing direction with an internal taper angle of 1° and extends to 5.469" below the upper edge of the right cylindrical section 118 where it is terminated by an inward step 170. An integral, external annular bead 172 surrounds the tube at a height of 3.703" above the step 170. Two axially spaced integral, external annular beads 174, 176 surround the tube externally to the step 170 to provide means for tensioning against the lower end of the teat cup. The lower bead 174 is positioned approximately at step level, the upper bead being spaced about 0.25" higher. Each of the beads 172, 174, 176 is of approximately semicircular cross-section protruding externally from the outer surface of tube 112, the semicircular cross-section having a radius of about 0.070". The semicircular cross-section of bead 172 is centered on a circular line of centers 178 that is 1.00" in diameter. The semicircular cross-section of beads 174 and 176 are centered on respective circular lines of centers 180, 182 that are 0.875" in diameter.

The tube wall between the beads 172, 176 is of a substantially uniform thickness of about 0.094" to provide a very flexible tube wall. The thickness increases with height above the bead 172, the outer periphery of the tube wall flaring outward with an initial angle of 2° from the vertical.

It will, of course, be understood that modification of the present invention in its various aspects will be apparent to those skilled in the art, some being apparent only after study and others being a matter of routine design. Further, the use of the particular materials and shapes described herein are not necessary features of the present invention. As such the scope of the invention should not be limited by the particular embodiment and specific construction herein described, but should be defined only by the appended claims and equivalents thereof.

What is claimed is:

1. In a unitary inflation suitable for insertion into a teat cup, to be used with a milking machine of the kind that applies pulsating pressure to a substantially airtight chamber found between the outside of the inflation and the inside of the cup, and a sub-atmospheric pressure to the interior of the inflation, the pulsating pressure varying between a higher pressure that is greater than the sub-atmospheric pressure and lower pressure, the improvement comprising:

an elongated resilient tube having an upstream retaining skirt for stretch fitting over an upstream end of the teat cup, and an external annular rib for tensioning against the lower end of the teat cup to provide a chamber between said tube and the teat cup interior for receiving application of the pulsating pressure, said tube having annular flange means extending inwardly, at the upstream end of said tube, from said retaining skirt, said flange means being adapted to receive and hold a teat, and said tube having an annular bead axially spaced by approximately a teat length downstream from said flange means, said annular bead being adapted to inhibit collapse when said chamber is at the higher pressure and the interior of said tube is at the sub-atmospheric pressure; and connection means at the downstream end of said tube for communicating the sub-atmospheric pressure to the interior of said tube.

2. A unitary inflation in accordance with claim 1 wherein said stiffening means includes a plurality of circumferentially spaced, axially elongated ribs.

3. In a unitary inflation suitable for insertion into a teat cup to be used with a milking machine of the kind that applies pulsating pressure to the exterior of the inflation and a sub-atmospheric pressure to the interior of the inflation, the improvement, comprising:

an elongated silicone tube having an upstream retaining skirt for stretch fitting over an upstream end of the teat cup and an external annular rib for tensioning against the lower end of the teat cup, to provide a chamber between said tube and the teat cup interior for receiving application of the pulsating pressure;

said tube having annular flange means extending inwardly, at the upstream end of said tube, from said retaining skirt, said flange means having a skirted inner portion connected to said retaining skirt by an upstreamwardly convex arcuate cushion, said flange means being adapted and dimensioned to hold a teat with said arcuate cushion portion against the udder where the udder joins the teat; and connection means for applying the sub-atmospheric pressure to the interior of said tube.

4. A unitary inflation in accordance with claim 3 wherein said skirted inner portion and said arcuate cushion are fashioned of much thinner material than the remainder of said skirt.

5. A unitary inflation in accordance with claim 4 wherein said thinner material has a thickness of about 0.063 inches and the remainder of said skirt has a thickness at least as great as about 0.125 inches.

6. A unitary inflation in accordance with claim 4 wherein said skirted inner portion is fashioned and sized to flex upward to form an upward directed annular rim when the inflation is removed from a teat.

7. An improved inflation suitable for insertion into a teat cup, to be used with a milking machine of the kind that provides a source of pulsating pressure to the exterior of the inflation and a source of substantially constant sub-atmospheric pressure to the interior of the inflation, the teat cup comprising a rigid cylindrical shell having a circular opening at its upper end and a cup shaped lower end with a smaller circular opening coaxial with the cylindrical shell, comprising:

an elongated cylindrical resilient tube flaring outwardly at its upper end to provide a throat concentric with said tube;

a cylindrically symmetric skirt, integral with and extending generally downwardly and inwardly from said throat, the lower extremity of said skirt being spaced from the exterior of said tube, and said skirt being formed and sized to stretch fit over and seal the upper end of the teat cup;

an attachment section integral with and extending generally upwardly and inwardly from said throat to provide a circular edge, said edge being coaxial with said tube and having a larger diameter than said tube;

a horizontal, annular flange integral with and extending inwardly from said circular edge, the inner circumference of said flange being sized and adapted for insertion of the entire length of a teat;

a first annular bead on the exterior of said cylindrical tube, said bead being spaced approximately a teat's length below said flange and integrally formed with said tube;

a second annular bead on the exterior of said cylindrical tube, said second annular bead being integrally formed with said tube and spaced below said upper end to extend through the smaller circular opening of the teat cup, said second annular bead being formed to fit against the lip of the smaller opening under tension to seal the opening.

8. The improved inflation of claim 7 wherein said elongated tube is made of silicone.

9. The improved inflation of claim 7 including a plurality of circumferentially spaced, axially elongated ribs integral with a portion of said tube upstream of said first annular bead.

10. The improved inflation of claim 7 including a downward extension integrally formed with said tube and having a thickened wall to provide rigidity for attachment of a milking line.

11. The improved inflation of claim 7 wherein said horizontal annular flange includes an annular cushion portion of arcuate radial cross-section protruding upwardly from said horizontal annular section.

12. The improved inflation of claim 11 where said horizontal annular flange includes a downwardly directed annular teat receiving skirt encircled by said annular cushion portion.

13. An improved inflation suitable for insertion into a teat cup, to be used with a milking machine of the kind that provides a source of pulsating pressure to the exterior of the inflation and a source of substantially constant sub-atmospheric pressure to the interior of the inflation, the teat cup comprising a rigid cylindrical shell having a circular opening at its upper end and a cup shaped lower end with a smaller circular opening coaxial with the cylindrical shell, comprising:

- an elongated cylindrical resilient tube flaring outwardly at its upper end to provide a throat concentric with said tube;
- a cylindrically symmetric skirt, integral with and extending generally downwardly and inwardly from said throat, the lower extremity of said skirt being spaced from the exterior of said tube, and said skirt being formed and sized to stretch fit over and seal the upper end of the teat cup;
- an attachment section integral with and extending generally upwardly and inwardly from said throat to provide a circular edge, said edge being coaxial with said tube and having a larger diameter than said tube;
- a horizontal, annular flange integral with and extending inwardly from said circular edge, the inner circumference of said flange being sized and adapted for insertion of the entire length of a teat;
- said horizontal annular flange including an annular cushion portion of arcuate radial cross-section protruding upwardly from said horizontal annular section; and
- said horizontal annular flange further including a downwardly directed annular teat receiving skirt encircled by said annular cushion portion.

14. An improved inflation suitable for insertion into a teat cup, to be used with a milking machine of the kind that provides a source of pulsating pressure to the exterior of the inflation and a source of substantially constant sub-atmospheric pressure to the interior of the inflation, the teat cup comprising a rigid cylindrical shell having a circular opening at its upper end and a cup shaped lower end with a smaller circular opening coaxial with the cylindrical shell, comprising:

- an elongated cylindrical resilient tube flaring outwardly at its upper end to provide a throat concentric with said tube;
- a cylindrically symmetric skirt, integral with and extending generally downwardly and inwardly from said throat, the lower extremity of said skirt being spaced from the exterior of said tube, and said skirt being formed and sized to stretch fit over and seal the upper end of the teat cup;
- an attachment section integral with and extending generally upwardly and inwardly from said throat to provide a circular edge, said edge being coaxial with said tube and having a larger diameter than said tube;
- a horizontal, annular flange integral with and extending inwardly from said circular edge, the inner circumference of said flange being sized and adapted for insertion of the entire length of a teat;
- said horizontal annular flange including an annular skirt normally directed downwardly from said horizontal flange for receiving and retaining a teat positioned within the inflation, said horizontal flange and said normally downwardly directed annular skirt being fashioned to form, upon removal of the inflation from the teat, an upwardly directed annular rim with reduced resistance to the withdrawal of the teat.

* * * * *

UNITED STATES PATENT AND TRADEMARK OFFICE
CERTIFICATE OF CORRECTION

PATENT NO. : 4,610,220
DATED : September 9, 1986
INVENTOR(S) : Edward Goldberg, Seymour Bazell It is certified that error appears in the above—identified patent and that said Letters Patent is hereby corrected as shown below:

In Column 1, Line 31, delete "Vacuum".

In Column 2, Line 41, delete "fixed" and substitute -- flexed -- therefor.

In Column 4, line 17, delete "41" and substitute -- 14' -- therefor.

In Column 5, Line 35, delete "inflation," and substitute -- inflation. -- therefor.

In Column 6, Line 19, delete "flares" and substitute -- flare -- therefor.

Signed and Sealed this

Third Day of March, 1987

Attest:

DONALD J. QUIGG

Attesting Officer

Commissioner of Patents and Trademarks